March 26, 1957 F. C. BAYER 2,786,482
FLOW DISTRIBUTOR
Filed April 21, 1953 3 Sheets-Sheet 1
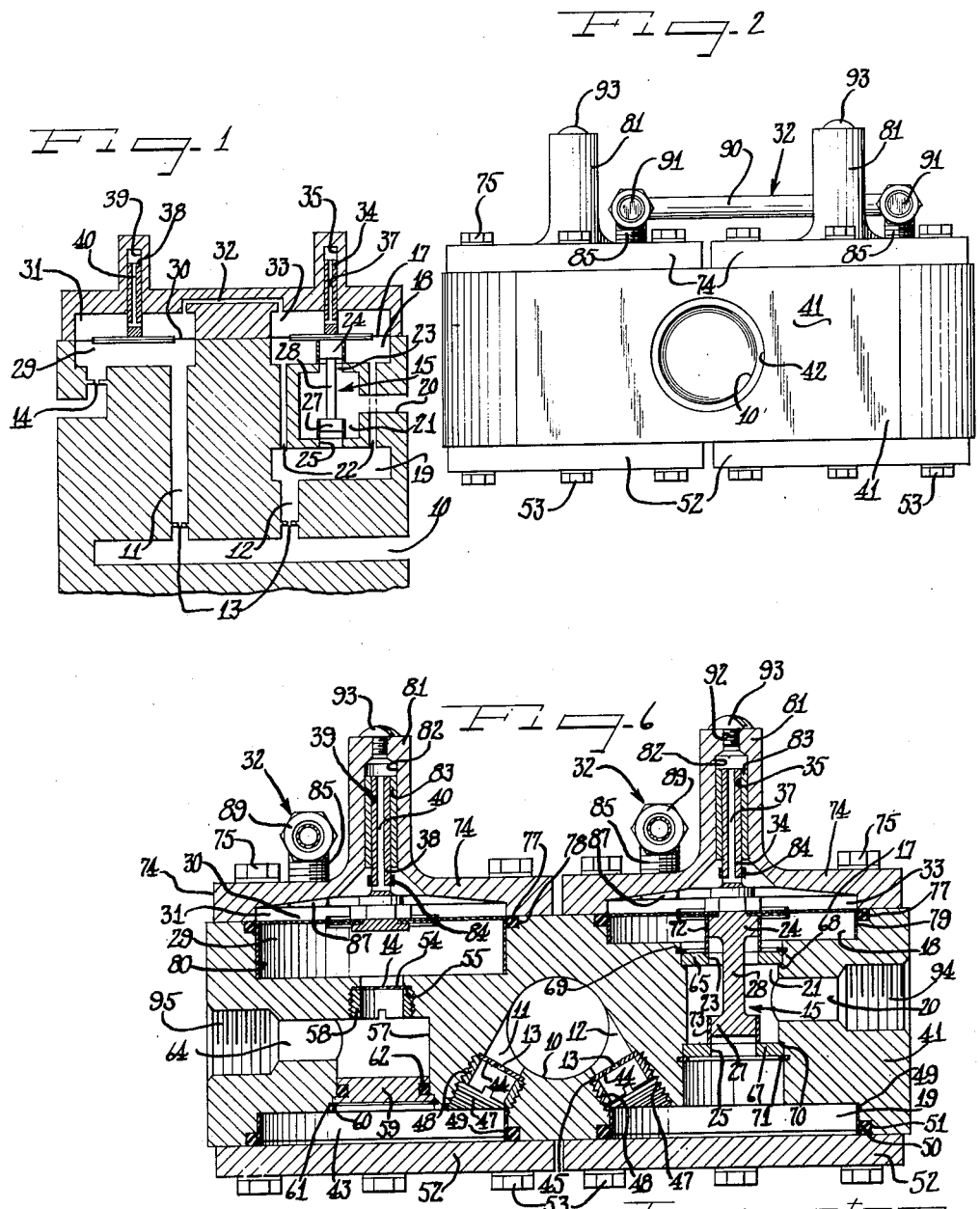
Inventor
Frank C. Bayer

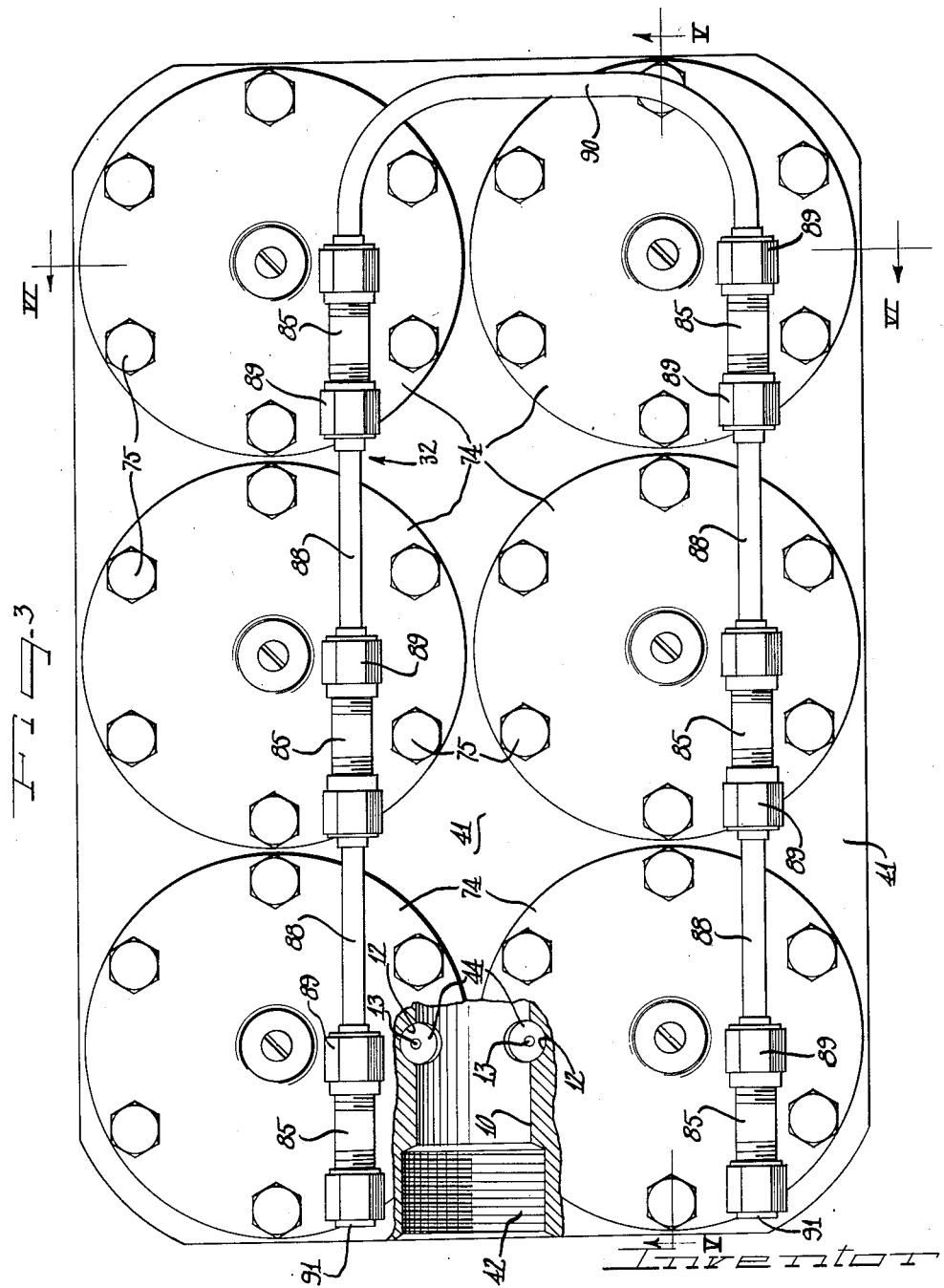

March 26, 1957 F. C. BAYER 2,786,482
FLOW DISTRIBUTOR
Filed April 21, 1953 3 Sheets-Sheet 3
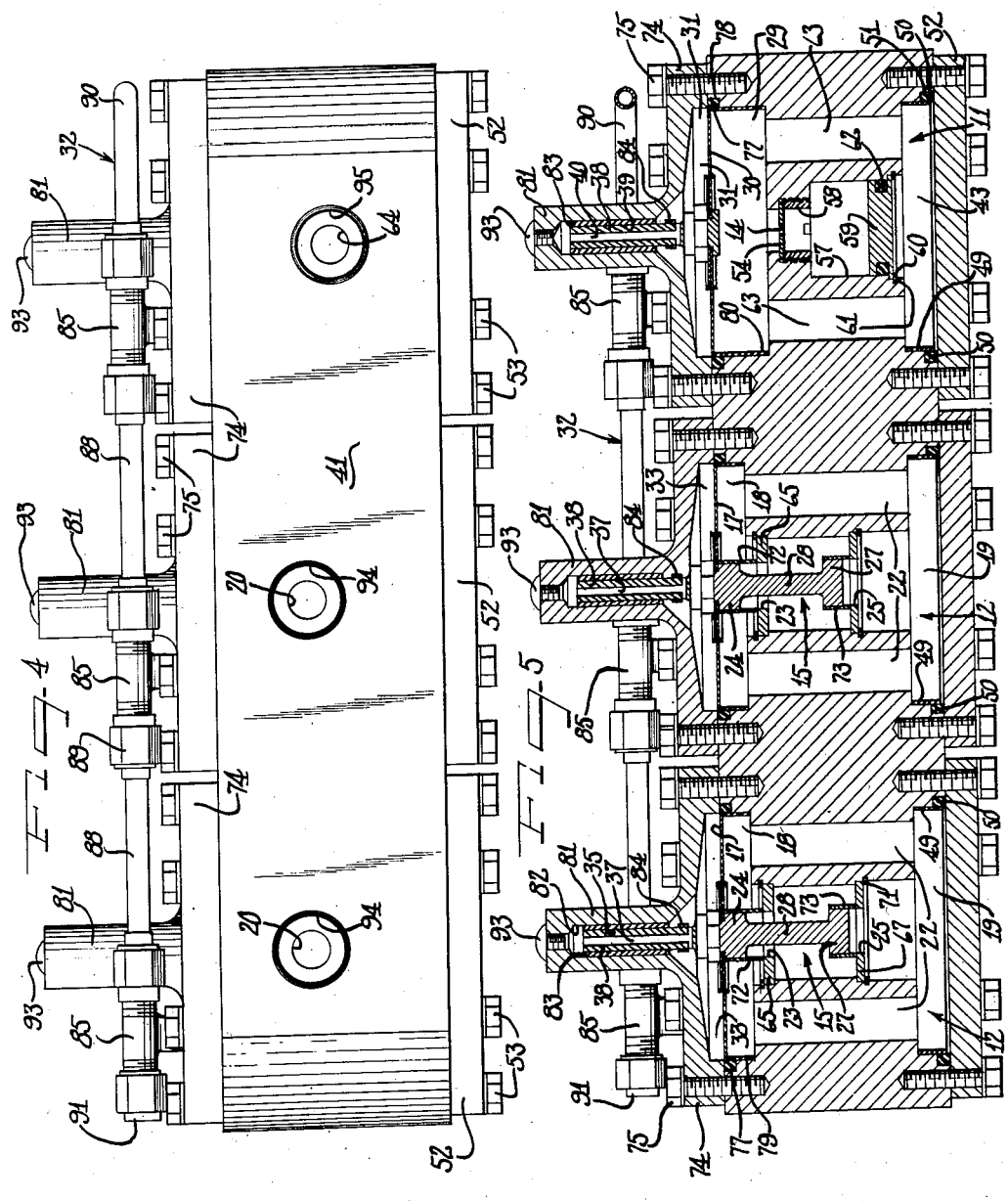
Inventor
Frank C. Bayer
Hill Sherman Meroni Gross & Simpson
Attys United States Patent Office 2,786,482
Patented Mar. 26, 1957

2,786,482

FLOW DISTRIBUTOR

Frank C. Bayer, Euclid, Ohio, assignor to Thompson Products, Inc., Cleveland, Ohio, a corporation of Ohio Application April 21, 1953, Serial No. 350,197

16 Claims. (Cl. 137—118)

The present invention relates to improvements in flow distributors of the kind adapted to effect equal or proportional distribution of fluid from a source to a plurality of outlets or discharge points, and more particularly concerns a flow distributor which is especially adapted for use in the distribution of low grade liquid fuels.

Commercial gas turbine fuel systems are being developed for use in stationary and locomotive applications. In general, diesel fuel oil is used during the starting and warm-up period. After a suitable warm-up period, inexpensive, low grade and generally dirty fuel known in the industry as Bunker C fuel supplied at 200 to 300° F. is fed to the turbines in place of the diesel oil. Diesel oil is again used for a short period of time prior to shutting down of the turbine to purge the fuel system of Bunker C fuel oil.

A flow distributor capable of operating satisfactorily with Bunker C fuel oil under the conditions briefly outlined above must have any moving parts thereof insensitive to contaminants or varnishing tendencies of Bunker C fuel oil, the relationship of parts must be such as to be capable of withstanding the temperatures of from 200 to 300° F. at which the Bunker C fuel oil is supplied, and there must not be any "blind passages" or stagnant areas to interfere with thorough purging of the Bunker C fuel oil from the unit on shut down.

The principal object of the present invention is to meet the foregoing and other requirements satisfactorily in a flow distributor unit for use in gas turbine fuel systems using Bunker C fuel oil, or other fuel systems where any one or more of the mentioned requirements are desirable.

Another object of the invention is to provide a flow distributor unit of large capacity but very compact construction.

A further object of the invention is to provide a fluid flow distributor in which all bearing parts are protected from the fuel.

Still another object of the invention is to provide a flow distributor having a novel flow control arrangement.

Yet another object of the invention is to provide novel guide means for the control valves in a flow distributor mechanism.

A still further object of the invention is to provide novel control valve means in a flow distributor structure.

It is yet another object of the invention to provide a novel method for assuring as nearly as practicable perfect seating of plural in-line coacting flow control valves in a flow control unit.

Other objects, features and advantages of the present invention will be readily apparent from the following detailed description of a preferred embodiment thereof taken in conjunction with the accompanying drawings, in which:

Figure 1 is a schematic sectional view through a flow distributor system embodying features of the invention;

Figure 2 is an end elevational view of a flow distributor embodying the system of Figure 1;

Figure 3 is a top plan view of the distributor unit shown in Figure 2;

Figure 4 is a side elevational view of the distributor unit;

Figure 5 is a longitudinal sectional detail view through the distributor unit taken substantially on the line V—V of Figure 3; and Figure 6 is a transverse sectional detail view taken substantially on the line VI—VI of Figure 3.

Although in certain aspects, as will be appreciated as the description proceeds, the present invention offers features that may be useful in flow distributors generally, the present invention is directed more especially to improvements in flow distributor systems wherein a plurality of branches from a main supply line or manifold lead to respective discharge points but are interconnected for equalization or proportioning of the flow through the respective branches, with one of the branches comprising a pilot in relation to which the remaining branch or branches are in slave relationship. That is, the slave passages are sensitive to variations in the flow rate through the pilot branch or passage through a control arrangement involving pressure sensitive control valves.

As schematically illustrated in Figure 1, a flow distributor system of this character includes a supply passage or manifold 10 to which fluid such as fuel oil is supplied under suitable pressure from a source. Leading from the manifold 10 is a plurality of branches, one of which is shown as comprising a pilot passage 11 and another of which is shown as comprising a slave passage 12, and it will be understood that there may be as many slave passages as desired.

For the attainment of substantially equal or proportioned flow through all of the branch passages leading from the manifold 10, each of the branch passages 11 and 12 is provided with a matched or proportioned metering orifice 13 and, in addition, downstream flow regulating means. In the pilot branch passage 11, the flow regulating means comprises a regulator orifice 14. In each of the slave branch passages 12, the regulating means comprises a pressure sensitive control valve 15. In each instance, pressure sensitive responsiveness of the valve 15 is attained by a diaphragm 17 secured across a dynamic pressure chamber 18 in the passage 12 and operable in response to pressure drop across the slave passage orifice 13 to move the valve 15 toward open position.

Improved flow characteristics through the slave passages 12 is attained by the provision of an auxiliary flow chamber 19 upstream from the dynamic pressure chamber 18 and downstream from the metering orifice 13 in the slave chamber, and by having the regulating valve 15 equipped to effect simultaneous control of fluid flow from both of the chambers 18 and 19 to a discharge point or outlet 20 by way of a pressure drop chamber 21. One or more connecting conduits or ducts 22, forming part of the slave passage 12 afford free flow of fluid between the dynamic pressure chamber 18 and the auxiliary chamber 19.

Flow of fluid from the dynamic pressure chamber 18 into the pressure drop chamber 21 occurs through an orifice 23 controlled by a piston-like poppet valve portion 24 of the valve 15 disposed adjacent to the diaphragm 17. Simultaneous fluid flow from the chamber 19 into the chamber 21 is afforded through an orifice 25 coaxially aligned with the orifice 23 and controlled by a piston-like poppet valve portion 27 of the valve 15 and connected to the poppet valve portion 24 by a stem portion 28 of the valve unit. Through this arrangement, the pressure drop across both of the orifices 23 and 25 will be identical under the control of the valve 15, and cumulative into the chamber 21.

Discharge pressure compensation in the slave passage or passages 12 is attained by referencing the regulating valve diaphragms 17 to the pressure drop across the metering orifice 13 in the pilot passage 11 as controlled by the regulator orifice 14. To this end, the pilot passage 11 is provided with a dynamic pressure chamber 29 located between the metering orifice 13 and the regulator orifice 14. Across this chamber 29 is secured a pressure sensitive diaphragm 30, the opposite side of which is exposed to fluid in a static pressure chamber 31. A connecting passage or duct 32 leads from the static pressure pilot chamber 31 to a respective static pressure chamber 33 associated with each of the slave passages 12 and to which is exposed the side of the respective diaphragm 17 opposite the dynamic pressure chamber 18. By having the connected static pressure chambers 31 and 33 filled with liquid such as oil in a closed system, under predetermined static pressure, pilot line or passage pressure is transmitted by operation of the pilot diaphragm 30 to the regulating valve diaphragms 17. Since the pilot pressure transmitting fluid is completely sealed from the fluid being distributed through the distributor, contamination of the pressure transmitting fluid is avoided.

In order to guide the regulating valves 15 without interference from any contaminants contained in the distributed fuel, valve guiding means are provided which are located on the static pressure sides of the diaphragms 17 of the regulating valves, and thus sealed by the diaphragms from any contact with the distributed fluid. To this end the regulating valves 15 are provided with respective guide stems 34 which project coaxially relative to the poppet valve portions 24 and 27 beyond the diaphragm 17, through the static pressure chamber 33 into a closed sliding bearing 35 within which the guide stem 34 is reciprocable. Locking of the guide stems 34 in the respective bearings 35 is avoided by having relief passage 37 longitudinally through the stem 34 in each instance and communicating with the static pressure chamber 33. This arrangement also assures lubrication of the bearing 35 by the clean oil in the sealed pilot pressure transmitting system. For guiding movements of the pilot diaphragm 30, a guide stem 38 is provided therefor projecting through the static pressure chamber 31 into reciprocable sliding relation in a bearing 39. Anti-locking relief for the guide stem 38 is afforded by a relief passage 40 longitudinally therethrough and communicating with the static pressure chamber 31.

In a practical embodiment of the flow distributor system schematically illustrated in Figure 1, a flow distributor unit as illustrated in detail in Figures 2 through 6, is especially adapted for the use in distributing flow of low grade fuel such as Bunker C fuel oil to gas turbines. This unit is preferably constructed upon a one-piece metal body block 41 of ample size to provide the desired number of flow distributing passages, in the present instance comprising a total of six such passages. The body block 41 is of flattened generally elongated rectangular form, with the supply passage or manifold 10 comprising a central longitudinal blind end bore opening through one end of the body block (Figs. 2 and 3). An internally threaded entrance 42 may be provided for the manifold bore to enable ready attachment of a fluid supply line nipple. At uniform, suitably spaced intervals the several branch distribution pasages lead off laterally from the manifold bore 10. Herein, three of the branch passages lead off from one side of the manifold bore 10 and three of the passages from the directly opposite side of the manifold bore. Any selected one of the branch passages comprises the pilot passage 11, while the remaining five passages comprise the slave passages 12.

In order to facilitate manufacture, all of the passages and chambers are formed as bores or counterbores that are readily accessible to drilling or boring tools from the respective faces of the body block 41. To this end, the dynamic flow chambers 19 forming part of the slave lines or passages are preferably provided as respective counterbores 19 in the bottom face of the body block 41, having regard to the position in which the unit is illustrated in the drawings. A similar counterbore chamber 43 is provided for the pilot line or passage. Thereby, the portions of the pilot and slave passages that lead from the manifold bore 10 are constructed as bores leading diagonally from the bottom chamber counterbores 19 and 43 more or less tangentially into the respective sides of the manifold bore 10. It is within these diagonal passage bores that the metering orifices 13 are preferably located.

Herein the orifices 13 are provided by respective thin orifice plate disks 44 each of which is secured in its respective passage bore against an annular outwardly facing shoulder 45 at the inner end of an internally threaded counterbore 47 by a ring nut 48 threaded into such counterbore. Unintentional backing out of the retaining ring nut 48 is prevented in each instance by a cylindrical retainer ring 49 fitting within the periphery of the bottom counterbore 19 or 43, as the case may be and having an inner edge portion in blocking relation to the adjacent outer end portion of the respective ring nut as best seen in Fig. 6. For replacement of any one of the orifice disks 44, therefore, removal of the associated retainer ring 49 must be effected before the retaining ring nut 48 can be backed out.

Each of the retainer rings 49 serves also to confine a sealing gasket O-ring 50 within a rabbet groove 51 at the mouth of the counterbore 19 or 43, as the case may be, for effecting a fluid tight seal for a closure plate 52 closing the respective chamber counterbore. Removable attachment of the several closure plates 52 may be effected by means of screws 53 secured through margins of the closure plates overlapping the lower face of the body 41 about the respective counterbore chambers.

For ready installation, or access for removal, the regulator orifice 14 in the pilot passage is constructed as a thin disk plate 54 (Figs. 5 and 6) which is seated against a shoulder 55 located intermediately in an upper reduced diameter portion of a through bore 57 concentric with and connecting the dynamic pilot pressure chamber 29 and the lower pilot pressure chamber 43. A ring nut 58 secures the orifice disk plate 54 in place. Thereby, installation or access for removal of the orifice disk plate 54 may be accomplished through the bottom chamber 43 when the closure plate 52 therefor is removed.

In order to block the bore 57 against passage of fluid from the chamber 43 directly thereinto, a closure 59 is secured into the lower end portion of the bore 57 removably as by means of a split snap ring 60 fitting into an annular groove 61 in the wall of the bore. Preferably a fluid seal between the perimeter of the plug 59 and the wall of the bore is provided by an O-ring 62. Through this arrangement, fluid entering the lower chamber 43 from the metering orifice 13 in the pilot passage must pass through one or more bypass passage bores 63 leading from the chamber 43 into the dynamic pressure chamber 29. Thence the fluid may drop across the regulator jet or orifice 14 into the chamber defined between the orifice plate 54 and the closure plug 59 for exit through a discharge port 64.

As best seen in Figures 5 and 6, the dynamic pressure chambers 18 for the slave passages 12, and the dynamic pressure chamber 29 for the pilot passage 11, are formed in the body block 41 by means of counterbores in the top face of the body block concentric with respectively the lower chamber counterbores 19 and 43, respectively.

It will also be observed that the pressure drop chamber 21 for each of the slave passages 12 is provided by a through bore connecting the respective dynamic pressure chamber counterbores 18 and the lower pressure chamber counterbores 19 concentrically in each instance.

In an efficient construction, the valve controlled slave passage orifices 23 and 25 are preferably similarly constructed as respective valve seat orifice disks 65 and 67 of substantial thickness. The valve seat orifice disk 65 is secured against a counterbored shoulder 68 in the upper portion of the chamber bore 21 by means of a split snap ring 69. The orifice disk 67 is secured against a counterbored shoulder 70 in the lower portion of the chamber through bore 21 by means of a split snap ring 71. In this manner the orifice plates 65 and 67 are secured in spaced relation respectively above and below the outlet port 20 from the pressure drop chamber 21 define between the spaced orifice plates.

Means are provided for assuming simultaneous seating of both of the valve portions 24 and 27 of the double poppet regulating valve 15 in each of the slave passages. To this end, the spaced, concentric valve portions 24 and 27 are provided with respective press fitted valve sleeve members 72 and 73, respectively. In adjusting the valve sleeves 72 and 73 to assure positive simultaneous seating and therefore closing of the respective orifices controlled thereby, the sleeves are initially assembled upon the respective upper and lower enlargements of the valve stem 28 providing the portions 24 and 27, to extend slightly axially downwardly beyond the ultimate desired position thereof. The valve members 15 are then thrust axially downwardly to drive the seating ends of the sleeves 72 and 73 against the respective seating orifice disks 65 and 67 until both of the valve sleeves 72 and 73 are equally uniformly in contact with the respective seating disks. If preferred, only the valve sleeve 73 need be projected axially beyond the end of the valve portion 27 and the assembly thrust force exerted to cause the sleeve 73 to abut the orifice disk 67 and slide on its valve enlargement portion 27 until full seating of the preset sleeve 72 has been attained. Thereby positive simultaneous seating of both valve portions in each of the regulating valves 15 is attained without prohibitively close tolerance machining.

For not only closing the upper face counterbores in the body block 41, but also for providing the static pressure chambers above the pressure sensitive diaphragms 17 and 30, preferably identical removably attached closure cap members 74 are provided. Each of the caps 74 has a marginal portion in lapping engagement with the face of the body block 41 about the respective counterbore which is closed by the cap and attachment of the cap is effected as by means of a plurality of cap screws 75. Each of the caps 74 is centrally recessed as shown to provide the respective static pressure chambers 31 or 33, as the case may be, above the respective diaphragms 30 and 17, which may be secured in place marginally by the closure caps. Leakage of fluid through the joints provided at the block engaging margins of the caps is prevented by respective fluid seals such as O-rings 77 mounted in appropriate rabbet grooves 78 provided respectively therefor at the upper edges of the respective counterbores. In the dynamic pressure chambers 18, the O-rings 77 are retained by cylindrical retaining rings 79 fitting within the peripheries of the respective chamber counterbores. The O-ring 77 sealing the dynamic pressure chamber 29 of the pilot line is retained by a retainer sleeve or ring 80 fitting within the periphery of the counterbore defining the dynamic pressure chamber 29.

On each of the closure caps 74 is provided a central upstanding elongated hollow boss 81 having a concentric bore opening down into the static pressure chamber recess in the cap and in the case of the caps 74 providing the static pressure chambers 33 for the sleeve passages, the boss bores, identified at 82 are provided with respective bearing liner bushings or sleeves 83 within which the guide stems 34 of the respective regulator valves 15 are slidably reciprocable. The bearing sleeves 83 have the bearing bores 35 therein engaged slidably by the guide stems 34. Limit upon upward reciprocal movement of the guide stems 34 in their bearing sleeves is accomplished by providing respective stop collars 84 on the lower end portions of the guide stems 34 below the lower ends of the bearing sleeves 83 and engageable with the lower ends of the bearing sleeves in stopping relation upon predetermined unseating movement of the respective regulating valves 15. A similar arrangement is provided for the pilot diaphragm guide means, the guide stem 38 of which is reciprocably slidably guided in the bearing bushing or sleeve 83 provided in the bearing boss 81 of the closure cap 74 over the dynamic pressure chamber 29 of the pilot passage. The sleeve 83 in this instance has the sliding bearing surface 39 therein for the guide stem 38. In an efficient manner of providing the interconnecting duct 32 for the static pressure fluid system, each of the closure caps 74 is provided with a branched T-coupling or union 85 having the central leg thereof screwed into a port 87 communicating through the top of the cap or cover member into the static pressure chamber 31 or 33, as the case may be. At each longitudinal side of the body block 41, the T-couplings 85 are connected by appropriate conduit sections 88 equipped with removable coupling nuts 89. The T-unions 85 of the two closure caps 74 at one end of the unit are connected in static fluid pressure communication by a U-shaped connecting duct 90. At the opposite end a similar connection may be afforded for the two adjacent passage cap couplings 85; but for convenience may, as best seen in Figures 2, 3 and 4, be closed off by respective removable closure plugs 91. Through this arrangement, filling of the static pressure fluid system may be easily effected by introducing the desired fluid such as clean oil of suitable grade and desired operational characteristics into the connecting duct 32 through one end of the duct before one of the closure plugs 91 is applied.

Since for proper operation the static pressure fluid system should be free from air, means are provided for purging the system of air as an incident to filling the same. Accordingly, air bleed ports 92 (Figs. 5 and 6) are provided in the upper ends of the respective guide bearing bosses 81 communicating with the top ends of the bores 82 in the bosses. Thereby, as the closed static pressure system is being filled with oil, air is purged through the bleed passages 92 by way of the relief passages 32 in the valve guide stems and the relief passage 40 in the diaphragm guide stem 38. When the system has been completely filled, the bleed passages 92 are plugged as by means of respective screws 93 threaded thereinto and having heads that sealingly overlie the tops of the bosses 81 about the bleed ports.

From the foregoing it will be apparent that all of the components of the flow distributor unit have been devised for mass production processes of manufacture and that as nearly as practicable a high degree of standardization has been attained in the various components that are used in multiples in the unit. Adjustments, repairs, or replacements can be readily effected since all components are readily accessible with minimum disarrangement of associated parts.

In the operation of the unit, fluid to be distributed has equal access from the large manifold bore 10 in the body block 41 to each of the branch passages comprising the pilot passage 11 and the slave passages 12. Within the pilot passage 11 and the slave passages 12, the fluid being distributed never comes in contact with any bearing surfaces and is completely sealed from the static pressure fluid in the regulating system. All of the guide structures are protected from the fluid being distributed and are lubricated by the oil in the static pressure regulating system. The double face poppet valves 15 operate simultaneously in both regulating valve portions thereof in each of the slave passages. Purging of the low grade operating fluid fuel as an incident to shut down is effectively accomplished by virtue of the absence of blind passages or stagnant areas since all portions of all of the passages except the sealed off static pressure area portions are within the positive dynamic flow path of the respective passages or lines.

For convenience in attaching delivery conduits to the slave passage outlet ports 20, the exit ends of such ports may be provided with enlarged internally threaded counterbores 94. The exit from the discharge port 64 of the pilot passage may be provided with an internally threaded counterbore 95.

All parts which determine the position of the double poppet piston regulating valves 15 and the valve seats are preferably made from the same material to eliminate the problem of differential expansion and thus possible lack of simultaneous seating of the companion valve portions.

It will be understood that modifications and variations may be effected without departing from the scope of the novel concepts of the present invention.

I claim as my invention:

1. In a flow regulating system, means providing a plurality of fluid flow passages, means for supplying fluid to said passages, one of said passages comprising a pilot for the remaining passages which are in slave relation thereto, regulating valves in the slave passages free from any bearing engagement within the passages, means providing a regulating fluid system connecting said pilot passage and said regulating valves and completely sealed from the flow paths within the pilot passage and the slave passages, and means for guiding said regulating valves sealed off from said flow paths and disposed protectively within said regulating fluid system.

2. In a fluid flow regulating apparatus, means providing a plurality of fluid flow passages, said means providing in said passages respective chamber portions divided into dynamic pressure and static pressure portions by flexible diaphragms sealingly cooperating to isolate the dynamic and static pressure portions, one of said passages being in pilot relation to the remaining passages which are in slave relation to the pilot passage, said slave passages having regulating valves therein connected to the diaphragms associated with the slave passages and the valves being entirely free from guide bearing contacts within the slave passages, means connecting the static pressure portions of the chambers for control of said valves by pressure conditions in the pilot passage, and means for guiding said valves comprising guide members extending beyond the diaphragms into the static pressure portions of the chambers associated with the slave passages.

3. In a method of assuring simultaneous seating of a double face poppet type valve which comprises equipping spaced valve portions of a double face poppet valve member with press fit valve sleeves gripping said portions with sufficient pressure to withstand normal intended usage and spaced apart coaxially approximately the same as a pair of fixed valve seats to be engaged by the faces of the poppet valve, bringing the valve into generally assembled relation with the valve seats and with the respective sleeves directed toward the valve seats with which they are to be associated, and thrusting the valve member toward the valve seats with substantially greater pressure than would be encountered in said intended usage and sufficient to force the sleeves into simultaneous positive adjusted seating relation to the respective valve seats.

4. In combination in a flow controlling device, a housing structure, a plurality of passages in said housing structure having respective inlets and outlets therefor, orificed valve seat means in certain of said passages, reciprocable plunger type valves engageable in fluid controlling relation with said seat means, said valves being in fully spaced relation to all surfaces in the passages and having only separable live contact sealing engagement with said seat means, pressure sensitive valve controlling diaphragms secured to said valves and to said housing structure, guide stems projecting rigidly from said valves beyond the diaphragms of the valves and sealed by the diaphragms from contamination by fluid flowing through said passages, and means carried by said housing structure for reciprocably guiding said stems over sufficient longitudinal bearing area thereof to support the valve against canting relative to said seat means in operation.

5. In combination in a flow regulating unit, a body block having a plurality of flow passages therethrough adapted to accommodate fluid having contaminants and including respective inlet and outlet portions for the passages, one of said passages comprising a pilot passage and the remaining passages comprising slave passages, each of said passages having a chamber portion, each of the chamber portions being divided by respective pressure sensitive diaphragm into a dynamic pressure portion and a static pressure portion, said static pressure portions being interconnected by fluid duct means isolated from said passages and filled with a pressure transmitting clean fluid so that the slave passage diaphragms are referenced to the pressure in the static pressure chamber portion of the pilot passage, regulating valves connected to the diaphragms in the slave passages and extending into regulating relation to the slave passages, guide means connected to the diaphragms in the slave passages and extending into the static pressure chamber portions, and means in said static pressure chamber portions for guiding said guide means.

6. In a fluid regulating device, a body block having a fluid bore therein, a plurality of passages in said body block communicating with said bore at one end of the passages and having ports communicating externally of the body block at the other ends of the passages, one of said passages comprising a pilot passage, all of said passages having respective orificed jets at said one ends therein adjacent to said bore, a regulating orifice in the pilot passage adjacent to said externally communicating port thereof, regulating valve means in the remaining passage, said pilot passage having a chamber between the orifice jet and regulating orifice therein, pressure sensitive means in control of said regulating valve means, means isolated from all of said passages referencing said pressure sensitive means to said pilot chamber, and means isolated from the fluid in all of the passages for guiding said pressure sensitive means.

7. In a flow regulating device, a body block, said body block having a plurality of through bores therein, respective closures at the opposite ends of said bores, said bores defining fluid passages having respective passage ports communicating externally of the body block and respective passage bores communicating with a common fluid passage bore in the body block, one of said passages providing a pilot passage and another of said passages providing a slave passage, pressure sensitive means dividing a portion of the slave passage into dynamic and static pressure portions and sealing said portions against fluid passage thereby, a regulating valve connected to said dividing means, pressure sensitive means dividing a portion of the pilot passage into dynamic pressure and static pressure portions and sealing such portions against fluid passage therebetween, means operatively connecting said static pressure portions, pressure transmission fluid in said static pressure portions and said connecting means completely isolated from contact with the fluid in said passages, and means providing a valve guide carried by the closure means at one end of the through bore defining the slave passage sealed from the dynamic pressure portion of the slave passage by said pressure sensitive means in the slave passage.

8. In a flow regulating device, a body block, said block having a fluid passage therethrough comprising concentric recesses in directly opposite faces thereof, a fluid port at one end of the passage communicating with one of said recesses, a central bore connecting said recesses, a fluid port communicating with the central bore and serving as the other end of the passage, flow regulating orifice means in said central bore, and a bypass bore alongside said central bore and connecting said recesses in fluid communication.

9. In a flow regulating device, a body block having opposite faces and a surface angular to said faces, a fluid passage bore in said body block opening through said angularly related surface, respective pairs of axially aligned oppositely opening recesses in said opposite faces of the body block at opposite sides of said bore, communication bores angling from the recesses in one face of the body block into communication with said fluid passage bore, respective through bores connecting the aligned pairs of recesses, additional fluid communication bores communicating with said through bores, said respective recesses and through bores and additional bores cooperating to provide branch passages from said fluid passage bores, fluid metering orifices in said angling bores, fluid regulating orifice means in said through bores and means effecting fluid communication between the respective pairs of recesses in by-pass relation to said through bores.

10. In fluid regulating apparatus, a body block, a flow passage bore in said body block, a recess in one face of said body block, a bore connecting said recess in fluid communication with said passage, an orifice plate shoulder in said connecting bore, an orifice plate seated on said shoulder for controlling flow of fluid through said bore, a ring nut threaded into said connecting bore and securing said orifice plate on said shoulder, a member seated in said recess and blocking backing out of said ring nut, and means securing said member in place.

11. In combination in a fluid regulating unit, a body block having a face recessed therein, fluid passage bores in said body block communicating with said recess and cooperating therewith to provide a fluid passage, a rabbet groove at the outer edge defining said recess, a sealing ring in said rabbet groove, a retainer ring peripherally engaging within said recess, and a closure member secured in closing relation to said recess and sealingly engaging said sealing ring and pressing the same into said rabbet groove and against said retainer ring.

12. In combination in a fluid regulating device, means defining a fluid passage, said passage having a pair of spaced valve seats therein defining orifices of substantial size, a reciprocable valve member extended through one of said orifices and having respective cylindrical poppet valve portions adjacent to said seats, said poppet valve portions each carrying a poppet valve sleeve in press fit relation thereon, said sleeves being adjusted on their respective poppet valve portions to engage the respective valve seats simultaneously.

13. In combination in a flow regulator, a body block having a fluid passage bore therein, means providing spaced valve seats defining fluid flow orifices, a bore communicating with said chamber, fluid flow passage means communicating with the respective opposite ends of said valve seat containing bore, and a flow regulating valve reciprocably extending through one of said orifices and adjacent to the other of said orifices and having respective poppet valve portions thereof adjacent to said valve seat means, said valve having longitudinally relatively adjustable valve seat engaging portions thereof adjusted to effect simultaneous engagement of the valve seat means with the valve seats.

14. In combination in a flow regulating device for low grade fuel oil, a body block having a pilot passage therein and a slave passage therein, orifice means in said slave passage for effecting predetermined pressure drop of fluid flowing therethrough, a pair of spaced fluid orifices of substantial size in the slave passage, a double poppet plunger type regulating valve member extending through one of said passage orifices and adjacent to the upper of said slave passage orifices, said regulating valve member having poppet valve means thereon for simultaneously engaging valve seats about said orifices in the slave passage, and means sealed from the slave passage for referencing said regulating valve to the pressure in said pilot passage.

15. In combination in a flow regulating device, a body block having a plurality of recesses in one face thereof, flow passages in said body block communicating with said recesses, diaphragms closing said recesses, closure caps enclosing said diaphragms and having static pressure recesses opening toward the diaphragm, lubricating fluid in said static pressure recesses, said closure caps having elongated central bosses thereon projecting away from said recesses, guide stems projecting from said diaphragms, and slidable bearings in said bosses reciprocably guiding said stems, said stems having lubricating passages therein for flow of lubricating fluid between said static pressure recesses and the end portions of the stems within said bosses.

16. In a flow distributor for handling fluid having contaminants therein detrimental to the operation of relatively movable bearing surfaces, means defining a plurality of flow passages with one of said passages in pilot relation to another of said passages which is in slave relation to the pilot passage, valve means including a valve seat and a separable line contact movable valve member in the slave passage for controlling flow through the slave passage, means for guiding the valve for movement relative to the seat, diaphragm means for sealing said guide means from said slave passage, a pressure sensitive member exposed within the pilot passage and movable pressure responsively, and a self-contained filled clean fluid closed circuit static pressure regulating system referencing said pressure sensitive member in the pilot passage to said slave passage valve on the guide means side of the slave passage diaphragm so as to make the slave passage valve responsive in its controlling movements to said seat to the pressure conditions in the pilot passage as reflected on said pressure sensitive pilot passage member.

References Cited in the file of this patent

UNITED STATES PATENTS

| | | |
|---|---|---|
| 1,299,130 | Cockburn et al. | Apr. 1, 1919 |
| 1,312,102 | Cockburn et al. | Aug. 5, 1919 |
| 1,464,767 | Kerns | Aug. 14, 1923 |
| 1,917,698 | Carson, Jr. | July 11, 1933 |
| 2,192,662 | Jones | Mar. 5, 1940 |
| 2,467,576 | Zimmerman | Apr. 19, 1949 |
| 2,622,610 |ет al. | Dec. 23, 1950 |
| 2,638,912 | Lee, II | May 19, 1953 |
| 2,661,756 | Noon et al. | Dec. 8, 1953 |
| 2,669,482 | Gold et al. | Feb. 16, 1954 |

FOREIGN PATENTS

| | | |
|---|---|---|
| 577,132 | Great Britain | May 7, 1946 |